United States Patent [19]

Enoki

[11] Patent Number: 5,373,881
[45] Date of Patent: Dec. 20, 1994

[54] HEAVY DUTY PNEUMATIC TIRE HAVING TREAD WITH SHOULDER RIBS

[75] Inventor: Yasutaka Enoki, Sayama, Japan

[73] Assignee: Bridgestone Corporation, Tokyo, Japan

[21] Appl. No.: 508,437

[22] Filed: Apr. 13, 1990

[30] Foreign Application Priority Data

Apr. 13, 1989 [JP] Japan .................................. 1-91726

[51] Int. Cl.$^5$ .............................................. B60C 11/06
[52] U.S. Cl. .............................................. 152/209 R
[58] Field of Search .......... 152/209 R, 209 D, 209 A, 152/DIG. 1; D12/142, 143

[56] References Cited

U.S. PATENT DOCUMENTS

| | | | |
|---|---|---|---|
| 3,727,661 | 4/1973 | Hoke | 152/209 R |
| 3,893,498 | 7/1975 | Wayne | 152/209 R |
| 4,230,512 | 10/1980 | Makino et al. | 152/209 R |
| 4,345,632 | 8/1982 | Takigawa et al. | 152/209 R |
| 4,756,352 | 7/1988 | Ogawa et al. | 152/209 R |

FOREIGN PATENT DOCUMENTS 55-94802 7/1980 Japan .
61-46606 7/1986 Japan .
61-196806 9/1986 Japan .

OTHER PUBLICATIONS

1978 Tread Design Guide, vol. 13, 1978, p. 132.

Primary Examiner—Geoffrey L. Knable
Attorney, Agent, or Firm—Sughrue, Mion, Zinn, Macpeak & Seas

[57] ABSTRACT

A heavy duty pneumatic tire including in its tread at least one circumferential main groove and shoulder rib grooves spaced from the circumferential main groove and arranged in the proximity of tread ends to define shoulder rib grooves. The shoulder rib grooves are formed to fulfill relationships of Rw/W=0.28–0.42, Rs/W=0.05–0.12 and Rd/W=0.07–0.19, where a distance from an equatorial plane to the tread end of the tire is W mm, a distance from the tread end to the shoulder rib groove is Rw mm, a width of the shoulder rib groove is Rs mm and a depth of the shoulder rib groove is Rd mm. Angles $\alpha$ and $\beta$ made by normal lines to surfaces of the tread and opposite walls of the shoulder rib grooves are in relations $-7° \leq \alpha$ and $\beta \leq 7°$, respectively.

6 Claims, 4 Drawing Sheets

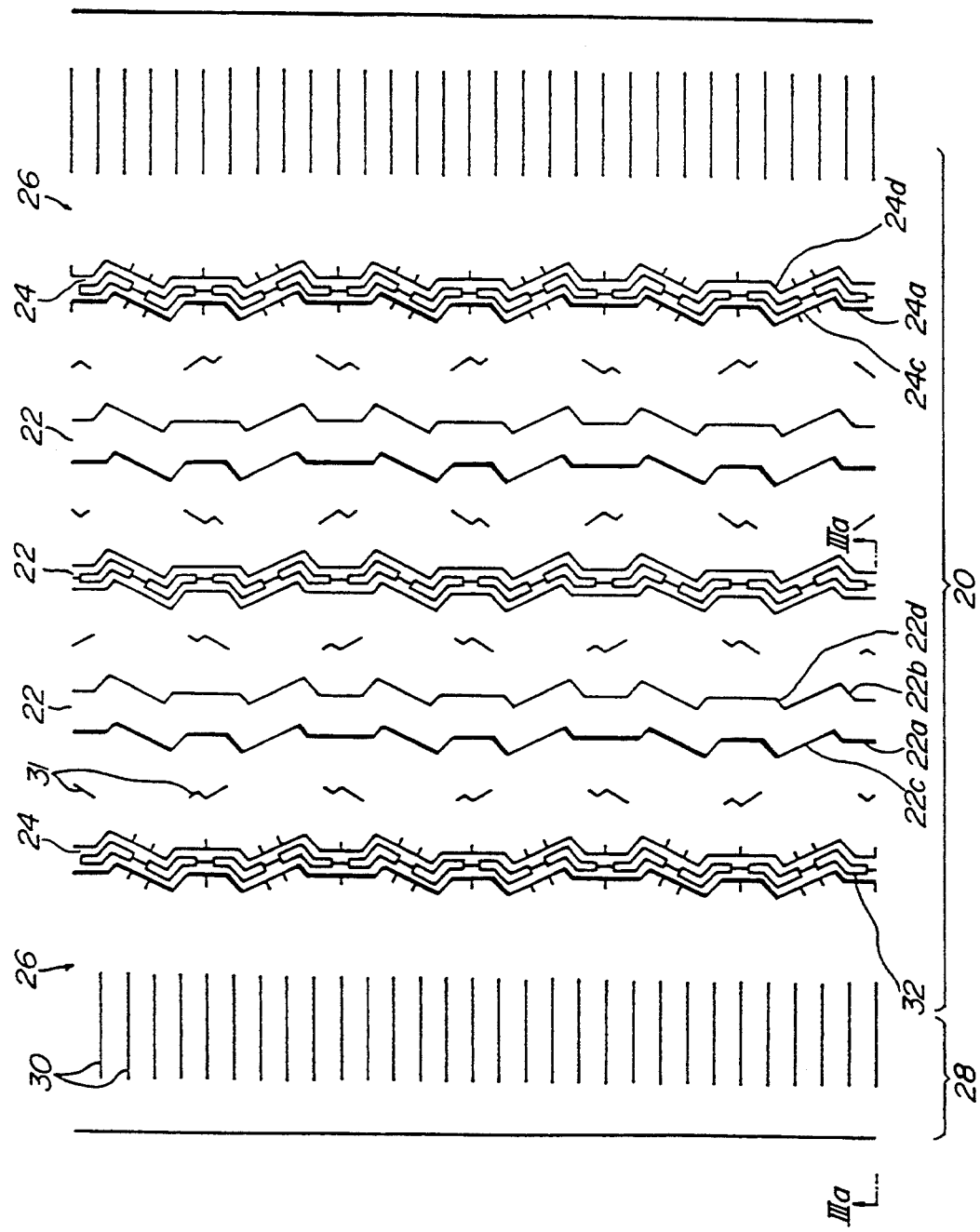
FIG._2

FIG_3a
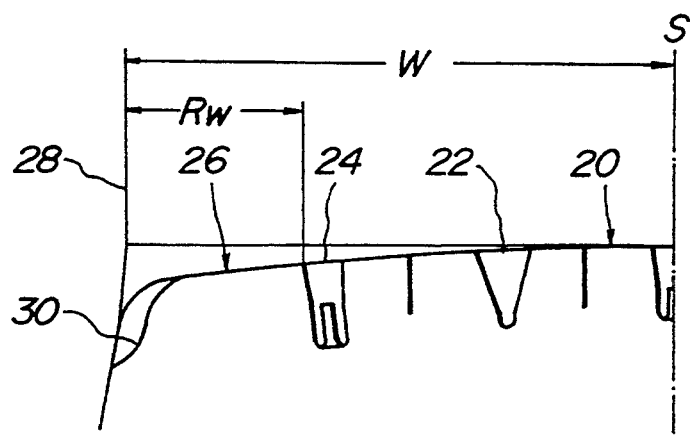
FIG_3b
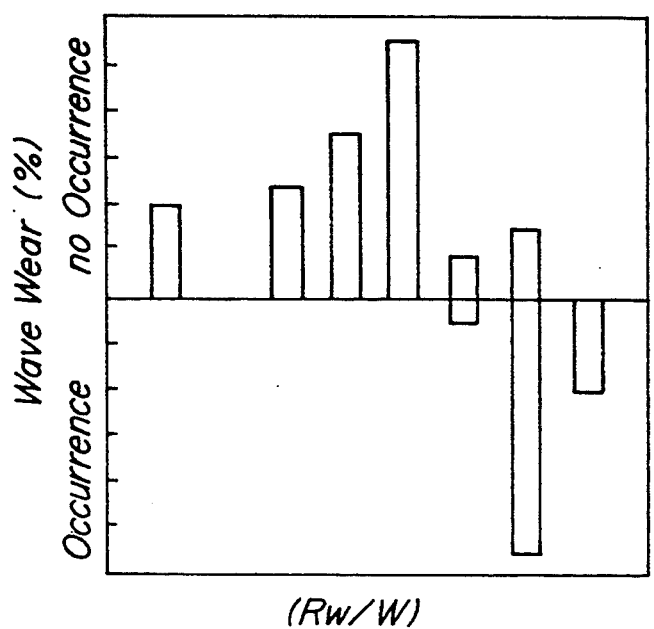
FIG_3c

FIG_4a
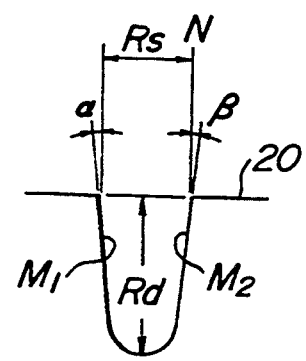
FIG_4b
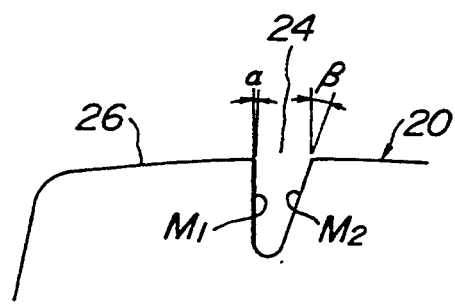
FIG_4c
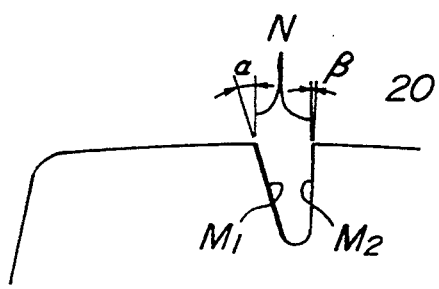

HEAVY DUTY PNEUMATIC TIRE HAVING TREAD WITH SHOULDER RIBS

BACKGROUND OF THE INVENTION

This invention relates to a tire mounted on a front axle of an idle wheel for a heavy duty vehicle such as trucks and buses, and more particularly to a heavy duty pneumatic tire which is able to reduce irregular wear which would occur in shoulder ribs of the tire.

Radial tires having many advantages such as high wear-resistance, small rolling-resistance and the like have been recently widely used even for trucks and buses.

With such tires used for idle wheels, it is known that local wear, so-called irregular wear occurs prior to wear all over outer surfaces of the tires. One of them is irregular wear in shoulder ribs formed in the proximity of tread ends by circumferential main grooves.

This irregular wear occurs in the following manner. Once fine wear has occurred in the shoulder rib due to difference in input from a road surface to the tire, the wear grows acceleratingly due to the difference in diameter at tread surfaces as the tire rotates.

In order to prevent such irregular wear in shoulder ribs of hitherto used tires, it has been proposed for example as shown in FIG. 1 to form a tread 10 with a plurality of circumferential main grooves 12 spaced apart from each other and circumferentially extending and shoulder rib grooves 14 arranged in the proximities of tread ends and circumferentially extending to form shoulder ribs 16 circumferentially extending.

In this case, the shoulder rib grooves 14 are formed so that a ratio of a distance Rw from a tread end to the rib groove to one half W of a tread width is substantially 6–25%. One end of each shoulder rib 16 merges into the shoulder 18.

With this arrangement, when the tire is rotated or rolled, the shoulder ribs are positively worn so that uniform wear in remaining portions of the tread is accomplished.

When the hitherto used tires having such shoulder rib grooves 14 are applied to roads including straight portions and relatively smooth surfaces, the desired results could be substantially obtained. However, if they are applied to roads having rough surfaces and curved regions, the shoulder ribs 16 are likely to suffer so-called shoulder wear. Moreover, the surfaces of the shoulder ribs 16 tend to wear unevenly in circumferential directions which is so-called wave wear. Furthermore, tears often occur along groove bottoms of the shoulder rib grooves 14.

SUMMARY OF THE INVENTION

It is an object of the invention to provide an improved heavy duty pneumatic radial tire which eliminates all the disadvantages of the prior art described above and reduces to a great extent the irregular wear in shoulder ribs of the tire.

In order to achieve this object, a heavy duty pneumatic tire including in its tread at least one circumferential main groove extending in a circumferential direction, and shoulder rib grooves spaced from the circumferential main groove and arranged in the proximity of tread ends to define shoulder ribs according to the invention, the shoulder rib grooves fulfill relationships:

$Rw/W = 0.28$–$0.42$ $Rs/W = 0.05$–$0.12$ $Rd/W = 0.07$–$0.19$ where a distance from an equatorial plane to the tread end of the tire is W mm, a distance from the tread end to the shoulder rib groove is Rw mm, a width of the shoulder rib groove is Rs mm and a depth of the shoulder rib groove is Rd mm, and angles $\alpha$ and $\beta$ made by normal lines to surfaces of the tread and opposite walls of the shoulder rib grooves fulfill relations $-7° \leq \alpha$ and $\beta \leq 7°$, respectively.

According to the invention, the positions of the shoulder rib grooves and the angles of walls of the shoulder rib grooves are appropriately determined in the above relations, so that the rigidity at shoulder ribs becomes more suitable. Therefore, the irregular wear at the shoulder ribs can be effectively prevented even on uneven roads having many curved portions much more on smooth roads having relatively many straight portions.

In order that the invention may be more clearly understood, preferred embodiments will be described, by way of example, with reference to the accompanying drawings.

BRIEF DESCRIPTION OF THE DRAWINGS

FIG. 2 is a view illustrating a tread pattern of a tire according to one embodiment of the invention;

FIG. 3a is a sectional view taken along a line IIIa—IIIa in FIG. 2;

FIG. 3b is a view illustrating the relation between the ratio of the width of shoulder rib to the one half of the tread width and the irregular wear at the shoulder rib;

FIG. 3c is a view illustrating an amplitude of shoulder rib grooves forming shoulder ribs;

FIG. 4a is a view illustrating a sectional shape of a shoulder rib groove preferable for the present invention; and FIGS. 4b and 4c are views for explaining relation between sectional shapes of the shoulder rib grooves and irregular wear of the shoulder ribs.

DETAILED EXPLANATION OF THE PREFERRED EMBODIMENTS

Figure 1:
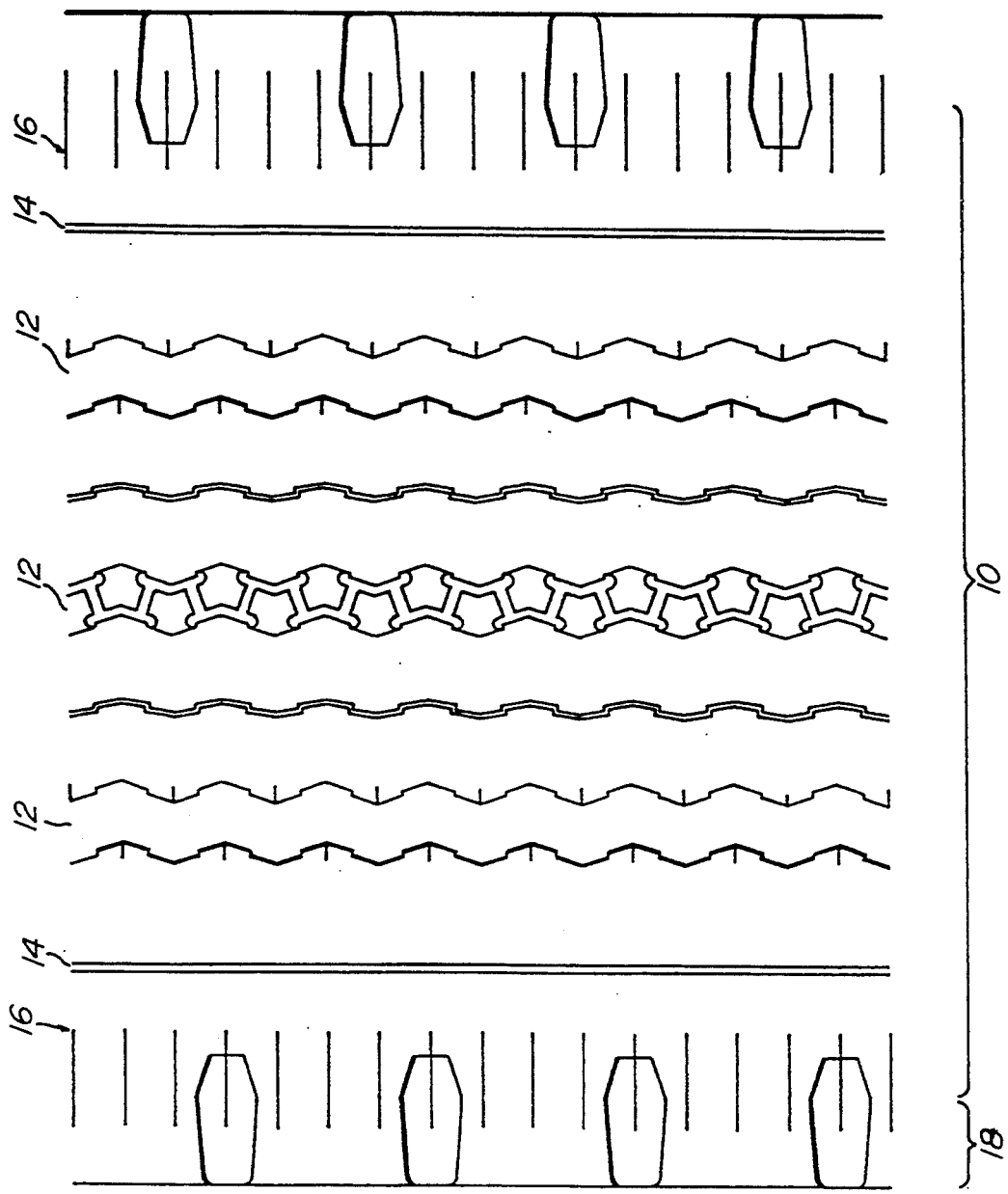
FIG. 1 is a view illustrating a tread pattern of the prior art.

Referring to FIG. 2 illustrating a preferred embodiment of the tire according to the invention, a tread 20 comprises circumferential main grooves (three in this embodiment) 22 spaced apart from each other and extending in circumferential directions of the tire, and shoulder rib grooves 24 spaced in width directions of the tire from the circumferential main grooves 22 and arranged in the proximities of tread ends to define shoulder ribs 26 extending in the circumferential directions of the tire.

Moreover, both ends of the tread 20 comprise sipes 30 extending in the width directions of the tire and spaced with predetermined intervals in the circumferential directions in a manner contiguous to shoulders 28, and stepped inclined sipes 31 formed between the circumferential main grooves 22 and between the circumferential main grooves 22 and the shoulder rib grooves 26. The internal construction of the tire is of a general radial tire so that it will not be illustrated.

Each of the circumferential main grooves 22 comprises a number of sections each consisting of a straight portion 22a extending substantially in parallel with an equatorial plane of the tire, a short inclined portion 22b obliquely contiguous to the straight portion 22a, a long inclined portion 22c obliquely contiguous to the short inclined portion 22b, and another short inclined portion 22d obliquely contiguous to the long inclined portion 22c and contiguous to a straight portion 22a of another section. These sections are alternately contiguously arranged in the circumferential directions to form the one circumferential main groove 22.

Moreover, each of the shoulder rib grooves 24 forming the shoulder ribs 26 comprises likewise a number of sections each consisting of a straight portion 24a extending substantially in parallel with the equatorial plane, a short inclined portion 24b obliquely contiguous to the straight portion 24a, a long inclined portion 24c obliquely contiguous to the short inclined portion 24b, and another short inclined portion 24d obliquely contiguous to the long inclined portion 24c and contiguous to a straight portion 24a of other section. These sections are alternately contiguously arranged in the circumferential directions to form the one shoulder rib groove 24.

The ribs extending in the circumferential directions defined by the circumferential main grooves 22 and the shoulder rib grooves 24 including the shoulder ribs 26 afford edges inclined relative to the equatorial plane of the tire. Therefore, the edges not only contribute to improve the driving performance and braking performance of the tire but also resist movement of the tire in the width directions restrain lateral slip of the tire to improve the steering ability and stability of the tire.

Moreover, when a road on which the tire runs is wet, the circumferential main grooves 22 and the shoulder rib grooves 24 ensure positive draining and in addition the edges inclined relative to the equatorial plane serve to cut water films formed on the wet road surfaces to be directly in contact with the road surfaces which is so-called "edge effect", thereby also improving the wet performance also.

The arrangement of the shoulder rib grooves 24 should be noticed in this case. With the tire according to the invention, as shown in FIG. 3a the arrangement of the shoulder rib grooves 24 is so selected so that a ratio Rw/W is 0.28–0.42, preferably 0.3–0.35, where Rw is a distance (mm) from the tread edge 28 to the shoulder rib grooves 24 and W is a distance (mm) from the tire equatorial plane S to the tread edge 28, that is to say, which is one half of a tread width.

Such a selection to fulfill the relation of the ratio is on the basis of experiment results as shown in FIG. 3b wherein the distance Rw was varied relative to the distance W and a wear rate of the tires was checked up which suffered irregular wear at shoulder ribs 26, particularly wave wear.

As can be seen from FIG. 3b, if the ratio Rw/W exceeds 0.42 or 42%, the wave wear increases and also so-called "step down" occurs which means the shoulder rib surfaces wholly wear.

This results from the fact that if the ratio Rw/W exceeds 42%, the rigidity of the shoulder ribs 26 is much higher than that of the center of the tread 20 so that when cornering the shoulder ribs will support side forces acting upon the tire with a higher ratio than that by the center of the tread 20, with the result that the shoulder rib would be worn off. Moreover, this gives rise to difference in diameter of the tire at the ribs, and owing to the difference in diameter the wear will develop with the rotation of the tire so that the wave wear and further the step down take place markedly.

On the other hand, if the ratio Rw/W is less than 0.28 or 28%, the rigidity of the shoulder ribs 26 is much lower than that of the center of the tread 20 so that movement of the shoulder ribs 26 caused by side forces become larger, with the result that wearing speed of the shoulder ribs 26 is higher than that of the center of the tread. As a result, irregular wear such as wave wear and step down will be caused. Therefore, the ratio Rw/W is preferably selected in the range of 30–35%.

Moreover, the distance from the tread end 28 to the shoulder rib grooves 24 is intended to mean a distance from the tread end 28 to a center of amplitudes d of groove walls of the rib grooves 24 positioned on the side of the tread end 28 as shown in FIG. 3c in the case of the shoulder rib grooves 24 extending in the circumferential direction zigzag in width directions of the tire as shown in FIG. 2.

Furthermore, a ratio of the groove width Rs (mm) of the shoulder rib grooves 24 to the half tread width W is dependent to a certain extent upon the widths of the circumferential main grooves. However, the ratio is selected to fulfill the relation of Rs/W=0.05–0.12. On the other hand, a depth Rd of the shoulder rib grooves 24 is selected to fulfill a relation of Rd/W=0.07–0.19.

In this case, the groove width Rs of the shoulder rib groove 24 is a width of the groove 24 in the width direction which opens at a tread surface of a newly produced tire, while the groove depth Rd is a depth from the tread surface to a bottom of the shoulder rib groove 24.

If the ratio Rs/W is more than 0.12 or 12%, the side force intensely acts on the rib ends adjacent the shoulder ribs under a used condition being subjected to the side force. As a result, the edges of the ribs adjacent shoulder ribs are forcedly worn to cause a difference in diameter so that river wear, rib punch and the like occur. Moreover, if the ratio Rs/W is less than 5%, the shoulder rib grooves increase a tendency holding therein small stones on roads. In order to prevent such a tendency, it will be considered to provide stone-excluding ridges as later described. After all, in the case of too narrow groove width, sufficient radii at groove bottoms cannot be insured so that there is a risk of tears occurring at the groove bottoms.

Moreover, when the ratio Rs/W is near to zero, it is substantially similar to that case as if the tread had no shoulder rib grooves. Therefore, it causes the same disadvantages as in the case of the wide shoulder rib grooves (Rw/W>0.42).

On the other hand, if the ratio Rd/W is more than 19%, the rigidity of the shoulder ribs is lower than those of the other ribs and more particularly movement of the shoulder ribs caused by side forces become larger, with the result that wearing speed of the shoulder ribs is higher and step down will increase. On the other hand when, the ratio Rd/W is less than 7%, the shoulder rib grooves are extinguished in an initial period of use and thereafter apparent shoulder rib widths become larger. Therefore, the rigidity of the shoulder ribs becomes too large relative to that of the ribs at the center of the tire so that the shoulder ribs support side forces with a higher ratio than that of the ribs at the center of the tread. As a result, shoulders are worn off to give rise to a difference in diameter. Owing to the difference in diameter wave wear and step down take place markedly. Accordingly, the ratio Rd/W is determined as 7-19%, preferably 12-16%.

Moreover, angles $\alpha$ and $\beta$ made by a normal line N to the surface of the tread 20 and groove walls $M_1$ and $M_2$ of the shoulder rib groove 24 in opposition to each other are selected to fulfill relations of $-7°\leq\alpha$ and $\beta\leq 7°$ as shown in FIG. 4a.

If the angle $\beta$ made by the normal line N and the groove wall $M_2$ located on the center side of the tread 20 is a relatively large as shown in FIG. 4b, the rigidity of the intersected portion between the groove wall and the tread is higher than that of the opposite shoulder rib 26 so that the edge at the intersected portion wears off, while step down will occur in the shoulder rib 26. Therefore, the above relation of the angle $\beta$ is selected.

In contrast herewith, if the angle $\alpha$ made by the normal line N and the groove wall $M_1$ of the shoulder rib groove 24 located on the tread end side is large as shown in FIG. 4c, the rigidity of the shoulder rib against the side force becomes higher, so that the wearing speed of the shoulder rib becomes higher than that of the adjacent rib, that is to say, the rib on the side of the center of the tread, with the result that the step down at the shoulder rib 26 will occur markedly.

Therefore, the inventors carried out an experiment in which the angles made by the normal line N to the surface of the tread and the groove walls $M_1$ and $M_2$ were varied to investigate irregular wear at shoulder ribs 26. As a result of the experiment, it has been found that the angles $\alpha$ and $\beta$ are more than $-7°$ and less than $7°$, respectively, and preferably within the range $0°-4°$ with satisfactory results as shown in FIG. 4a.

As can be seen from FIG. 4a, according to the invention the angles made by the surfaces of the tread and the walls $M_1$ and $M_2$ of the shoulder rib groove 24 of the tire are smaller than those of the tire of the prior art. Therefore, there is a risk of the shoulder rib groove 24 holding therein small stones on roads.

In order to solve this problems, therefore, according to the invention there are provided in the shoulder rib grooves 24 the stone-excluding ridges 32 spaced in the extending directions of the grooves 24 with predetermined intervals as shown in FIGS. 2 and 3a. An outer end of each of the stone-excluding ridges 32 is located radially inwardly of the surface of the tread 20. When a portion of the tread 20 including the shoulder rib grooves 24 contacts a road surface, small stones and the like will be forced into the shoulder rib grooves 24 against the stone-excluding ridges 32. However, the small stones and the like are forced out of the grooves 24 with resilient returning forces of the ridges 32 when the part of the tread exits from the road surface.

In this embodiment, moreover, although there have been provided in the circumferential main grooves 22 stone-excluding ridges similar to those above described, the invention is not limited in the feature. They may be provided in other circumferential main grooves. Moreover, the stone-excluding ridges may be dispensed with in the shoulder rib grooves or the circumferential main grooves.

Comparative Test

A comparative test on irregular wear was effected with tires according to the invention and the prior art, which will be explained hereinafter.

⊙ Tested Tires

Radial tires were tested whose size was 11R22.5/16PR.

Tires according to the invention; They had the tread pattern as shown in FIG. 2 whose dimensions were 210 mm in tread width, 11.5 mm in width of circumferential main grooves, 32.5 mm in distance between centers of circumferential main grooves, 13.7 mm in depth of the circumferential main grooves, 34.1 mm in shoulder rib groove position (distance from tread end), 8.8 mm in width of the shoulder rib grooves, 15.2 mm in depth of the shoulder rib grooves, and 7.1 mm in circumferential pitches of sipes.

Tires of the prior art; They had the tread pattern as shown in FIG. 1 whose shoulder rib groove position (distance from tread end) was 52 mm.

⊙ Testing Method

The above tires were mounted on a front idle axle of one vehicle which was driven in respective testing areas. Run distances until tire exchanging due to irregular wear were measured and compared.

⊙ Result of Test

Following Tables show data of the result of the test.

TABLE 1

| | Run distance until tire exchanging | |
|---|---|---|
| | Maximum run distance (km) | Minimum run distance (km) |
| Tire according to the invention | 79,351 | 74,481 |
| Tire of the prior art | 74,189 | 69,236 |

(Testing area A)

TABLE 2

| | Run distance until tire exchanging | |
|---|---|---|
| | Maximum run distance (km) | Minimum run distance (km) |
| Tire according to the invention | 89,000 | 68,594 |
| Tire of the prior art | 71,895 | 62,206 |

(Testing area B)

TABLE 3

| | Run distance until tire exchanging | |
|---|---|---|
| | Maximum run distance (km) | Minimum run distance (km) |
| Tire according to the invention | 111,820 | 86,694 |
| Tire of the prior art | 81,825 | 80,851 |

(Testing area C)

As can be seen from the Tables 1-3, the tires according to the invention can extend run distances of the tires until tire exchanging due to irregular wear at shoulder blocks of the tires in comparison with tires of the prior art in any testing areas.

It will be understood by those skilled in the art that this invention is not limited in the above embodiment and various changes in form and details can be made therein without departing from the spirit and scope of the invention. For example, the shoulder rib grooves may be arranged extending along the equatorial plane of the tire and substantially in parallel with each other.

Therefore, the tire according to the invention can effectively prevent irregular wear at shoulder ribs of the tire as shown in Tables 1-3.

What is claimed is:

1. A heavy duty pneumatic tire including in its tread at least one circumferential main groove extending in a circumferential direction, and shoulder rib grooves extending in the circumferential directions and spaced from the circumferential main groove and arranged in the proximity of tread ends to define shoulder ribs, wherein said shoulder rib grooves fulfill relationships:

$Rw/W = 0.28–0.35$ $Rs/W = 0.05–0.12$ $Rd/W = 0.07–0.19$ where a distance from an equatorial plane to the tread end of the tire is W mm, a distance from the tread end to the shoulder rib groove is Rw mm, a width of the shoulder rib groove is Rs mm and a depth of the shoulder rib groove is Rd mm, and wherein angles $\alpha$ and $\beta$ made by normal lines to surfaces of the tread and opposite walls of the shoulder rib grooves fulfill relations $-7° \leq \alpha$ and $\beta \leq 7°$, respectively, wherein each of the shoulder rib grooves comprises a number of sections each consisting of a straight portion extending substantially in parallel with the equatorial plane of the tire, a short inclined portion obliquely contiguous to the straight portion, a long inclined portion obliquely contiguous to the short inclined portion, and another short inclined portion obliquely contiguous to the long inclined portion and contiguous to a straight portion of another section with the inclined portions arranged alternately in opposite directions to each other.

2. A heavy duty pneumatic tire as set forth in claim 1, wherein said Rw/W is 0.3–0.35.

3. A heavy duty pneumatic tire as set forth in claim 1, wherein said Rd/W is 0.12–0.16.

4. A heavy duty pneumatic tire as set forth in claim 1, wherein said shoulder rib grooves are provided therein with stone-excluding ridges spaced from each other in extending directions of the shoulder rib grooves and positioned radially inwardly from the surface of the tread.

5. A heavy duty pneumatic tire as set forth in claim 4, wherein said circumferential main groove is provided therein with stone-excluding ridges.

6. A heavy duty pneumatic tire as set forth in claim 1, wherein each of the circumferential main groove comprises a number of sections each consisting of a straight portion extending substantially in parallel with the equatorial plane of the tire, a short inclined portion obliquely contiguous to the straight portion, a long inclined portion obliquely contiguous to the short inclined portion, and another short inclined portion obliquely contiguous to the long inclined portion and contiguous to a straight portion of another section with the inclined portions arranged alternately in opposite directions to each other.

* * * * *